Sept. 13, 1949.  F. H. JOHNSON  2,481,844
WELDING MECHANISM
Filed Nov. 18, 1946  2 Sheets-Sheet 1
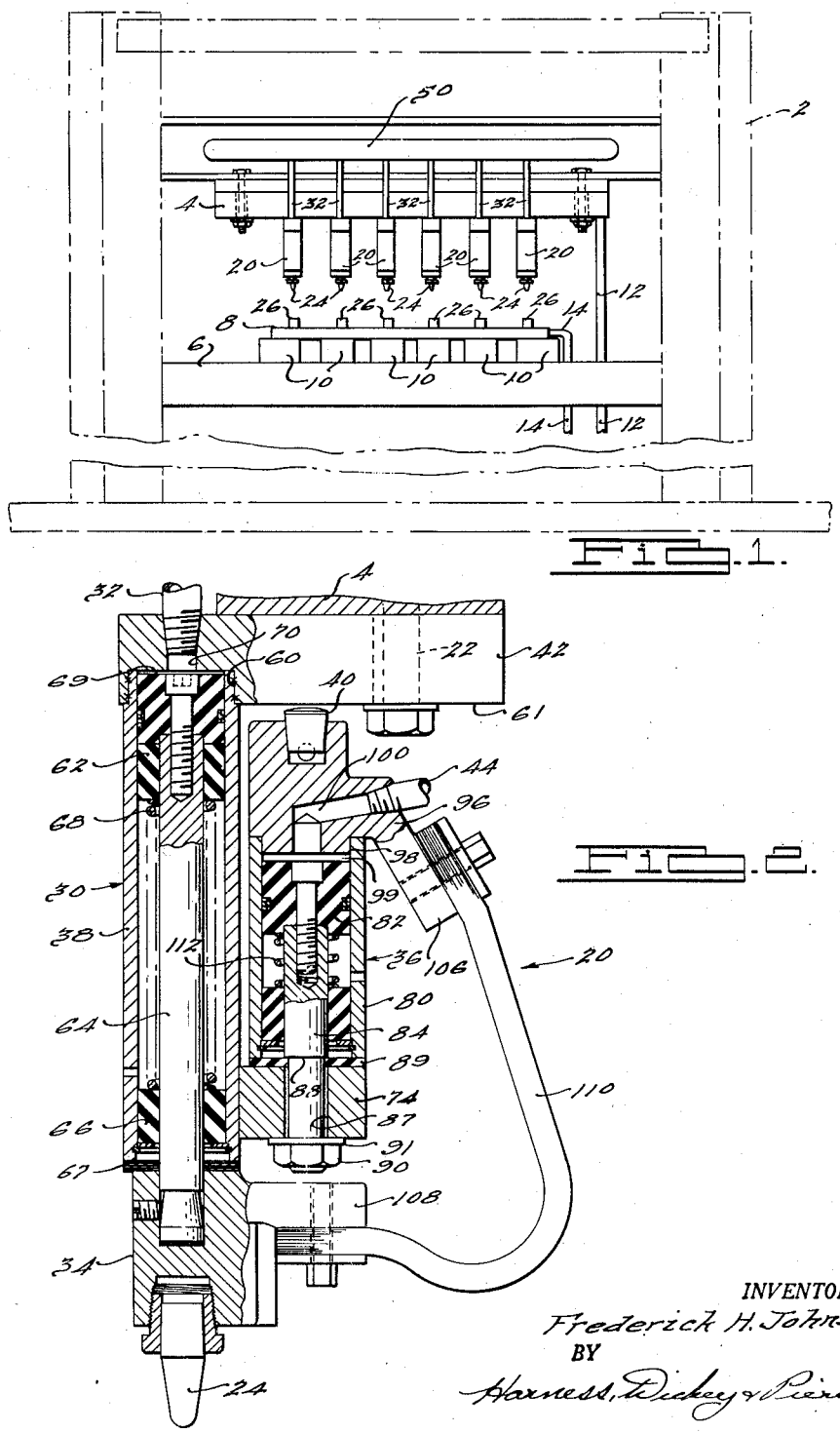
INVENTOR.
Frederick H. Johnson.
BY
Harness, Dickey & Pierce.
ATTORNEYS.

Sept. 13, 1949. F. H. JOHNSON 2,481,844
WELDING MECHANISM
Filed Nov. 18, 1946 2 Sheets-Sheet 2
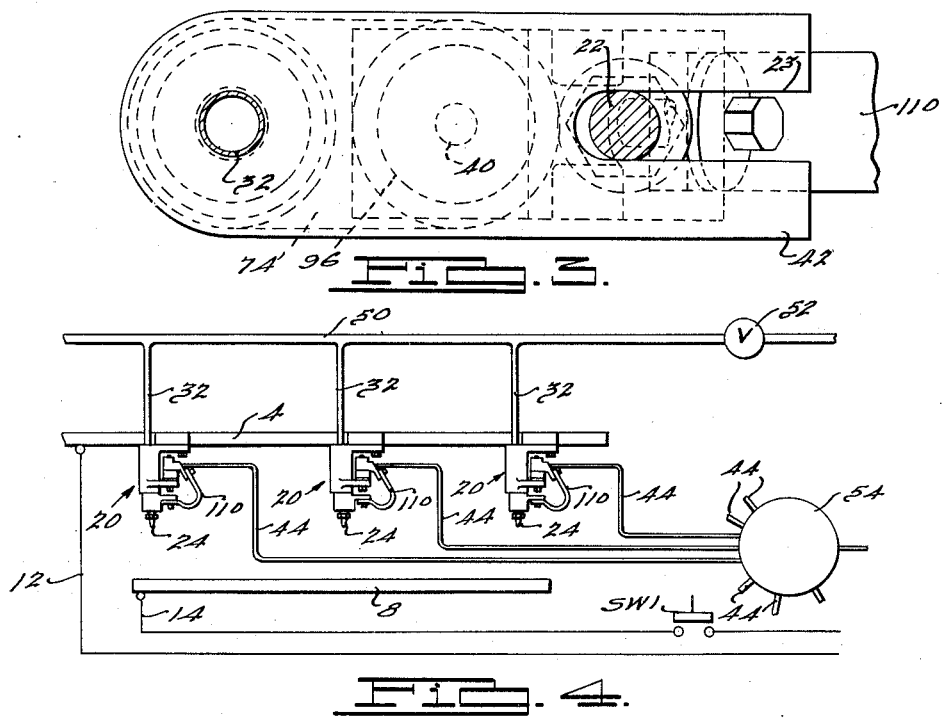
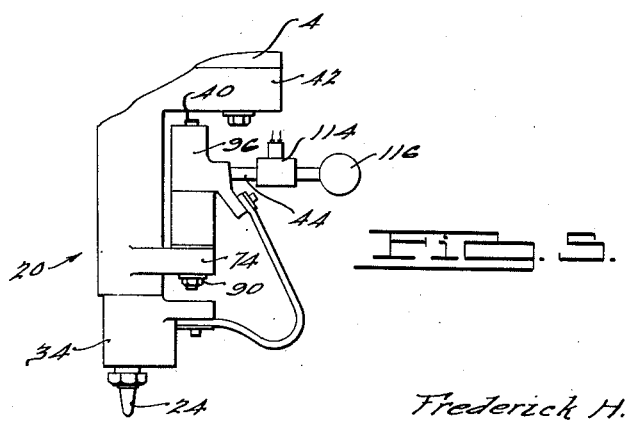
INVENTOR.
Frederick H. Johnson.
BY
Harness, Dickey & Pierce.
ATTORNEYS.

Patented Sept. 13, 1949

2,481,844

UNITED STATES PATENT OFFICE 2,481,844

WELDING MECHANISM

Frederick H. Johnson, Pleasant Ridge, Mich.

Application November 18, 1946, Serial No. 710,437

15 Claims. (Cl. 219—4)

The present invention relates generally to electric welding mechanisms and is particularly directed to the provision of a machine and apparatus therefor embodying improvements over the structure disclosed and claimed in Purat Patent No. 2,372,117 granted March 20, 1945.

The principal objects of the present invention are: to provide a welding machine having a plurality of unitary independent welding heads which may be removed and replaced with a minimum of effort; to provide such a machine in which the unitary welding heads may be individually adjusted; to provide such a multiple-head welding machine in which the number of heavy welding current conducting leads are reduced to a minimum; to provide such a multi-element welding machine in which the individual welding heads are each carried by a common current conducting bus; to provide such a multiple welding machine in which each of the individual unitary welding heads contains its own welding current control switch whereby relatively small fluid conveying conduits or electrical control circuits may be led to individual welding heads to control the action of the same rather than the more cumbersome and expensive large welding current conducting busses; to provide a composite welding head which is easily and economically fabricated and installed; to provide such a composite welding head having a current conducting base supporting an electrode positioning member and also supporting a current controlling member having an element engageable with the base whereby the electrodes may be selectively energized by control circuits; to provide a generally improved welding mechanism of the class described. Further objects will be apparent from the specification and appended claims.

A preferred but illustrative embodiment of the invention is shown in the accompanying drawings throughout the several views of which corresponding reference characters are used to designate corresponding parts and in which:

Fig. 1 is a partial diagrammatic view of a welding machine embodying the invention, Fig. 2 is a view in partial central vertical section of a welding head embodying the invention, Fig. 3 is a plan view of the welding head of Fig. 2, Fig. 4 is a diagrammatic view of a plurality of welding heads assembled to a common bus, and Fig. 5 is a diagrammatic view showing a modified form of control for the welding head.

It will be appreciated from a complete understanding of the present invention that the improvements thereof may be embodied in various forms and may be utilized for various specific purposes. By way of illustration but not of limitation, the invention is herein disclosed in connection with a machine of the same general type as is disclosed in said Purat patent.

Referring to the drawings, the present machine comprises generally a supporting frame structure 2 upon which is located in a fixed manner, but electrically insulated therefrom, a first current conducting bus 4 which is located above and in spaced relation to a table portion or work surface 6 on which is carried a second current conducting bus 8, and which bus 8 is electrically insulated therefrom, as by insulation 10. Preferably the busses 4 and 6 extend in spaced parallel relation and have current conducting lead portions 12 and 14, respectively, which may be connected to a suitable source of welding energy, such as a welding transformer or welding battery. A plurality of unitary welding heads, generally designated 20, are each suitably secured to the lower surface portion of the bus 4, as by a bolt 22, whereby a welding electrode 24 carried by each of the heads 20 is operable to engage a workpiece, not shown, which is in electrical contact making engagement with the lower bus 8. As shown, the bus 8 has a plurality of upstanding fixed welding electrodes 26 which are in vertical alignment with the movable electrodes 24 and upon which the workpiece to be welded is placed. It is to be distinctly understood, however, that in many instances it may be desirable to omit the electrodes 26 for the particular type of welding to be desired, and in other instances it may be desirable to place the electrodes 26 out of vertical alignment with the movable electrodes 24. It will be appreciated while the electrodes 24—26 are illustrated as being in a straight row, other relative positionings may be reverted to, depending upon the shape of the work.

Each of the welding heads 20 comprises an electrode positioning member 30 which, in the instance shown, is actuated by fluid pressure through a fluid conveying conduit 32 whereby a movable welding electrode carrying member 34 may be moved from a work-retracted to a work-engaging position. A contact member positioning means 36 is carried by the stationary portion 38 of the electrode positioning member 30 whereby a contact member 40 carried by the means 36 may be selectively brought into engagement with a plate-like base member 42 of the welding head 20 which plate-like base member 42 is preferably made of good electrical conducting material and is held in face-to-face engagement with the bus 4 by means of the previously mentioned bolt 22. The contact member positioning means 36 is actuated by means of fluid supplied from a fluid conveying conduit 44.

Fluid from a suitable source of pressure is admitted to a common manifold 50, which is in open communication with all of the conduits 32, so that when fluid pressure is admitted thereto, as by the controlling valve 52, all of the electrode positioning members are actuated whereby all of the electrodes 24 are moved into engagement with the workpiece to be welded. Each of the fluid conveying conduits 44 are individually connected to a distributor 54 which distributes fluid pressure from a common source to one or more of the contact member positioning means 36 whereby one or more of the contact members 40 are moved into engagement with their respective base members 42 for connecting their respective electrodes 24 to the common bus 4 whereby current flows from the bus 4 to the bus 8 through the workpiece between the respective electrodes 24 and 26 to accomplish the weld.

Referring more specifically to the unitary welding heads 20 and still more specifically to the electrode positioning members 30 thereof (which members 30 are disclosed and claimed in copending application, Serial No. 650,632, filed February 27, 1946, now Patent No. 2,465,456, dated March 29, 1949), the member 30 comprises a stationary member 38 which is in the form of an open-ended cylindrical member the upper end of which is received within a recess 60 opening outwardly through the lower surface 61 of the member 42. The member 38 extends substantially perpendicularly to the surface 61 and positioned therein is a piston member 62 which has a piston rod 64 extending outwardly from the lower open end of the member 38. The outwardly extending portion of the piston rod 64 carries the previously mentioned electrode carrying member 34. An insulator 67, which may be in the form of a washer through which the piston rod 64 is slidable, is preferably interposed between members 34 and 38.

The upper end of the piston rod 64 is guided for reciprocal movement within the member 38 by the piston member 62, which is fabricated of electrical insulating material; and, the lower end of the piston rod 64 adjacent the lower open end of the member 38 is supported for reciprocal movement by an annular guide or bearing member 66, which is also fabricated from electrical insulating material, whereby the piston rod 64 and the electrode carrying member 34 connected thereto are insulated from the member 38 and the base member 42. A retracting spring 68 is positioned under tension between the piston member 62 and the guide member 66 whereby the piston member 62 and its associated rod 64 is continually urged in one direction which, as shown, is in the electrode retracted direction. The diameter of the spring 68 is such that when it is engaging the rod 64 it will not engage the inner wall of the member 38 or conversely the diameter of the spring 68 may be sufficiently great so that when it is in engagement with the inner wall of the member 38 it will not engage the rod 64.

Fluid is admitted to the chamber 69 within the member 38 above the piston member 62 through an aperture 70 opening through the upper face of the base member 42. This aperture 70 is suitably internally threaded for receiving the externally threaded end of the conduit 32.

A suitable bracket 74 is rigidly secured to the lower end of the member 38, as by welding, and underlies an extending portion of the base member 42 and carries the contact member positioning means 36. The means 36 comprises an open-ended cylindrical member 80 in which is positioned a piston member 82 also fabricated of an electrical insulating material. A piston rod 84 is suitably carried by the piston member 82 and extends downward therefrom and outward through the lower open end of the cylindrical member 80. A reduced diameter portion of the rod 84 extends through an aperture 87 in the bracket 74. The shoulder 88 formed at the intersection of the normal and reduced diameter portions of the rod 84 seats against an annular insulating member 89 which abuts the upper face of the bracket 74. The rod 84 is clamped to the bracket 74 by a nut 90 which seats against a second annular insulating member or washer 91 abutting the lower face of the bracket 74. The bracket member aperture 87 is of greater diameter than the reduced diameter portion of the piston rod 84 so that the piston rod 84 is secured to but insulated from the bracket 74. The member 89 is of sufficient diameter so that, when the cylindrical member 80 is at its lowermost position, it seats against the member 89 and is maintained electrically insulated from the bracket 74.

An adapter 96 for holding the contact member 40 is suitably secured to the upper end of the cylindrical member 80 and has a reduced diameter portion 98 which telescopes within the upper end of the member 80. The telescoping portions are suitably welded together to provide a closed upper end for the member 80. A chamber 99 is provided within the member 80 intermediate the piston member 82 and adapter 96 which is in open communication with the conduit 44 through a passageway 100.

The contact member 40 is carried within a recess in the upper end of the adapter 96 and is engageable, upon upward movement of the cylindrical member 80 and adapter 96, with the lower surface 61 of the base member 42 for establishing an electrical circuit between the member 42 and the adapter 96. The adapter 96 and electrode carrying member 34 each have projecting contact lugs 106 and 108 respectively, which are interconnected by means of a laminated, flexible current-conducting cable 110.

It is believed that the remainder of the constructional details may best be understood by a description of the operation of the welding machine. A workpiece is first placed upon the electrodes 26 and positioned in the desired manner with respect thereto; and then the controlling valve 52 is energized to supply fluid pressure to the manifold 50, at which time fluid under pressure passes into the chambers 69, forcing the members 62 downwardly and the welding electrodes 24 associated therewith into engagement with the upper surface of the workpiece. Next the distributor 54 is controlled so that fluid pressure is supplied to the one (or more) of the means 36 associated with the electrode 24 which is to be energized, whereby the contact member 40 associated therewith is moved upward into engagement with the associated base member 42 establishing an electrical circuit from the bus 4 through the base member 42, the contact member 40, the adapter 96, the cable 110 to the electrode carrying member 34. Next the main welding current control switch SW1 is closed thereby initiating a flow of welding current through the electrodes 24 and 26 associated with one or more of the welding heads 20 in which the contact member positioning means 36 has been energized. After the completion of this weld, the main welding current control switch SW1 is opened and then the one (or more) of the control means 36 which was just energized is de-energized allowing a spring 112 therein to move the associated adapter 96 and contact member 40 downwardly so that the electrical circuit between the adapter 96 and the base member 42 is open. At the same or subsequent time, another (or others) of the control contact member positioning means 36 is energized in a manner similar to that just described bringing another one (or more) of the contact members 40 into engagement with the respective base member 42 to energize another one or more of the electrodes 24, after which the main current controlling switch SW1 is again energized to initiate another weld.

It will be noted that in the structure just described and where air or a gaseous fluid is used as the actuating medium for the control means 36, it may take an appreciable length of time to fill the entire length of conduit 44, from the head 20 to the distributor 54, with fluid to move the associated contact member 40 into engagement with its associated base member 42. It may be desired in some instances to speed up this operation and in such event the fluid distributor, as shown, may be replaced by an electrical distributor and an individual solenoid valve may be inserted in the conduit 44 immediately adjacent each adapter 96. In this construction each of the solenoid valves 114 is supplied with fluid pressure from a common manifold 116. The solenoid valve 114 is a three-way type which when energized, opens the manifold 116 to the passageway 100 and, when de-energized, closes its communication with the manifold 116 and opens the passageway 100 to atmosphere whereby the fluid pressure within chamber 99 may be relieved. With this modified construction, it will be noted that a much shorter length of fluid conducting passageway 44 needs to be exhausted and to be filled each time the control means 36 associated therewith is actuated.

As most clearly appears in Figure 3, the previously mentioned mounting studs 22 are received in corresponding slots 23 provided therefor in the supporting member 42. With this arrangement, it will be appreciated that in addition to permitting a rotative adjustment of each unit 20, about the axis of the studs 22, a bodily adjustment thereof is also possible.

What is claimed and is desired to be secured by United States Letters Patent is as follows:

1. In a welding mechanism, the combination of an electrode positioning means operable to position an electrode in a work engaging and a retracted position, said positioning means being adapted to be supported upon the framework of a welder, an electrical conducting member positioned adjacent said positioning means, an electrical circuit controlling means carried by said positioning means as an integral part thereof, said controlling means being engageable with said conducting member to complete an electrical circuit, and a current conducting path for conducting current to the electrode from said circuit controlling means.

2. In a welding mechanism, the combination of an electrode positioning means operable to position an electrode in a work engaging position and in a retracted position, comprising a movable electrode carrying member and a member adapted to be supported on the framework of a welder, an energizable electrical circuit controlling means carried by said framework supported member, and means providing a current conducting path from said circuit controlling means to said movable member.

3. In a welding mechanism, the combination of a supporting structure, a current conducting bus carried by said structure, an electrode positioning means having relatively movable members, one of said members being adapted to carry a welding electrode and operable to be moved into a retracted and an operative position, means securing the other of said members to said structure adjacent said bus, a contact member, means carried by said other member and operable to move said contact member into electrical conducting engagement with said bus, and means providing a current conducting path including said contact member whereby the flow of welding current is controlled by the position of said contact member relative to said bus.

4. In a welding mechanism, the combination of a supporting structure, a current conducting bus carried by said structure, an electrode positioning means having relatively movable members, one of said members being adapted to carry a welding electrode and operable to be moved into a retracted and an operative position, adjustable means securing the other of said members to said bus, a contact member, fluid actuated means having a pair of relatively movable members, one of said pair of members being carried by said other member, the other of said pair of members being operable to move said contact member into electrical conducting engagement with said bus, and means providing a current conducting path including said contact member whereby the flow of welding current is controlled by the position of said contact member relative to said bus.

5. A unitary welding head comprising a pair of relatively movable co-operating members, one of said members being adapted to carry a welding electrode, the other of said members being of electrical conducting material and forming one electrode of a switch means, means on said other member whereby the head may be adjustably positioned on a current conducting supporting member forming part of a welding circuit and a second electrode of said switch means carried by said other member and movable into engagement with said one electrode for controlling flow of welding current through the head.

6. A unitary welding head adapted to be secured as a unit to a supporting structure adjacent a current conducting bus, comprising a current conducting member adapted to be secured in electrical conducting relation to said bus whereby the head is fixedly supported by and said conducting member is electrically connected to the bus, means rigid with said conducting member and having a relatively movable element adapted to carry a welding electrode and movable between a working position and a retracted position, a contact member, means carried by said rigid means for selectively positioning said contact member in an electrical circuit making position with said conducting member and in a non-circuit making position, and means providing an electrical conducting path from said contact member and in a noncircuit making position, and means providing an electrical conducting path from said contact member to said movable element.

7. A unitary welding head adapted to be secured as a unit to a supporting structure adjacent a current conducting bus, comprising a current conducting member adapted to be secured in electrical conducting relation to said bus whereby the head is fixedly supported by and said conducting member is electrically connected to the bus, means rigid with said conducting member and having a relatively movable element adapted to carry a welding electrode and movable between a working position and a retracted position, a contact member, fluid actuated means comprising a piston structure and a cylinder structure, one of said structures being carried by said rigid means, the other end of said structures being movable relative to said one structure for selectively positioning said contact member in an electrical circuit making position with said conducting member and in a noncircuit making position, means providing an electrical conducting path from said contact member to said movable element, means electrically insulating said movable element from said conducting member, and means carried within said cylinder structure for insulating said piston structure from said cylinder structure.

8. A unitary fluid actuated welding head comprising a supporting member adapted to be secured to a supporting structure whereby the head may be secured to said structure as a unit, fluid actuated means carried by said member and having a movable element adapted to position an electrode in a work-engaging and a retracted position, means providing a current conducting path to the electrode, a contact member controlling current flow through said path, and actuating means carried by said fluid actuated means for moving said contact member into circuit making and circuit breaking positions.

9. A unitary fluid actuated welding head comprising a current conducting plate-like member provided with means for adjustably securing one surface of the same to a current conducting bus, a first piston cylinder secured to said member and extending outwardly of the surface of said member opposite said one surface, a first piston in said cylinder and having a piston rod, a portion of said rod extending outwardly of said cylinder, means on said rod extending portion adapted to support a welding electrode, a second piston cylinder, a second piston in said second cylinder and having a piston rod, means holding the rod of said second piston in fixed position relative to said first cylinder, contact means carried by said second cylinder and engageable with said conducting member to close an electrical circuit therebetween, and current conducting means electrically connecting said contact means to said electrode supporting means.

10. A unitary fluid actuated welding head comprising a current conducting base member having means whereby it may be secured to a current conducting bus, an electrode supporting means carried by said base member and operable to position an electrode in a work-engaging position and in a work-retracted position, and a contact member supporting means carried in fixed position relative to said base member and operable to position said contact member in circuit closed and circuit open position with respect to said base member.

11. A unitary fluid actuated welding head comprising a current conducting base member having means whereby it may be secured to a current conducting bus, an electrode supporting means comprising a cylinder carried by said base member and having a movable piston element operable to position an electrode in a work-engaging position and in a work-retracted position, a contact member supporting means carried in fixed position relative to said base member and operable to position said contact member in circuit closed and circuit open position with respect to said base member, means electrically insulating said element from said base member, and means electrically connecting said contact member with said element.

12. In a welding mechanism, a supporting structure, a plurality of current conducting busses, at least one of said busses being electrically insulated from said structure, a plurality of unitary welding heads, each of said heads comprising a current conducting base member carried by a first of said busses, each of said heads comprising an electrode operable to engage a workpiece in electrical contact with a second of said busses and comprising an electrode positioning means carried by said base member and operable to move the electrode associated therewith into work-engaged and work-retracted positions, a common source of energy for actuating said positioning means whereby said electrodes are concurrently in said work-engaged and said work-retracted position, a contact member carried by a contact member positioning means, said contact member positioning means being carried by said base member but electrically insulated therefrom and operable to move said contact member into engagement with said base member whereby an electrical circuit to the associated one of said electrodes is controlled, and means for selectively actuating said contact member positioning means.

13. A unitary fluid-actuated welding head comprising a current-conducting base member having means whereby it may be secured to a current-conducting bus, a first member having an elongated downwardly-opening chamber carried by said base member, a piston in said chamber of electrically-insulating material and cooperable with the portion of said chamber intermediate said piston and said base member to form a pressure-chamber portion, a piston rod carried by said piston and extending outwardly of the open end of said chamber, an annular member of electrically-insulating material carried within said chamber intermediate said open end and said piston, said rod extending through the central opening of said annular member, resilient means interposed between said annular member and said piston for urging said piston in one direction, electrode-holding means carried by the portion of said rod extending outwardly of said chamber, a second member supported by said first member for reciprocal movement toward and away from said base member, a contact carried by said second member and engageable with said base member to complete an electrical circuit therebetween, and current-conducting means electrically connecting said contact with said electrode-holding means.

14. A unitary fluid-actuated welding head comprising a current-conducting base member having means whereby it may be secured to a current-conducting bus, a first member having an elongated downwardly-opening chamber carried by said base member, a piston in said chamber of electrically-insulating material and cooperable with the portion of said chamber intermediate said piston and said base member to form a pressure-chamber portion, a piston rod carried by said piston and extending outwardly of the open end of said chamber, a guide member of electrically-insulating material carried by said first member and adapted to guide said rod electrode-holding means carried by the portion of said rod extending outwardly of said chamber, a second member supported for reciprocal movement toward and away from said base member by said first member, a contact carried by said second member and engageable with said base member to complete an electrical circuit therebetween, and current-conducting means electrically connecting said contact with said electrode holding means.

15. A unitary fluid-actuated welding head comprising a current-conducting base member having means whereby it may be secured to a current-conducting bus, a first member having an elongated downwardly opening chamber carried by said base member, a piston in said chamber of electrically-insulating material and cooperable with the portion of said chamber intermediate said piston and said base member to form a pressure chamber portion, a piston rod carried by said piston and extending outwardly of the open end of said chamber, a guide member of electrically-insulating material carried by said first member and adapted to guide said rod electrode-holding means carried by the portion of said rod extending outwardly of said chamber, a supporting member carried by and extending laterally of said first member, a second member located intermediate said supporting member and said base member having an elongated downwardly opening chamber, a piston in said second-member chamber, a piston rod carrying said second-named piston and having a portion extending outwardly of said second-member chamber, said second-named rod extending portion being secured to said supporting member whereby when fluid under pressure is admitted to said second-member chamber above said second-named piston said second member will be moved toward said base member, a contact carried by said second member and engageable with said base member to complete an electrical circuit therebetween upon movement of said second member toward said base member, and current-conducting means electrically connecting said contact with said electrode-holding means.

FREDERICK H. JOHNSON.

REFERENCES CITED

The following references are of record in the file of this patent:

UNITED STATES PATENTS

| Number | Name | Date |
|---|---|---|
| 2,244,508 | Von Henke et al. | June 3, 1941 |
| 2,287,945 | Purat | June 30, 1942 |
| 2,372,117 | Purat | Mar. 20, 1945 |

Certificate of Correction

September 13, 1949

Patent No. 2,481,844

FREDERICK H. JOHNSON

It is hereby certified that error appears in the printed specification of the above numbered patent requiring correction as follows:

Column 6, line 72, beginning with the words "and in" strike out all to and including "member" in line 74;
and that the said Letters Patent should be read with this correction therein that the same may conform to the record of the case in the Patent Office.

Signed and sealed this 10th day of January, A. D. 1950.

[SEAL]

THOMAS F. MURPHY,
*Assistant Commissioner of Patents.*